Feb. 6, 1968  T. D. GLASS  3,367,062
LURE LADDER FOR A FISHING TACKLE BOX
Filed April 7, 1966  3 Sheets-Sheet 1

INVENTOR.
THEODORE D. GLASS
BY
Webb, Burden, Robinson & Webb
ATTORNEYS.

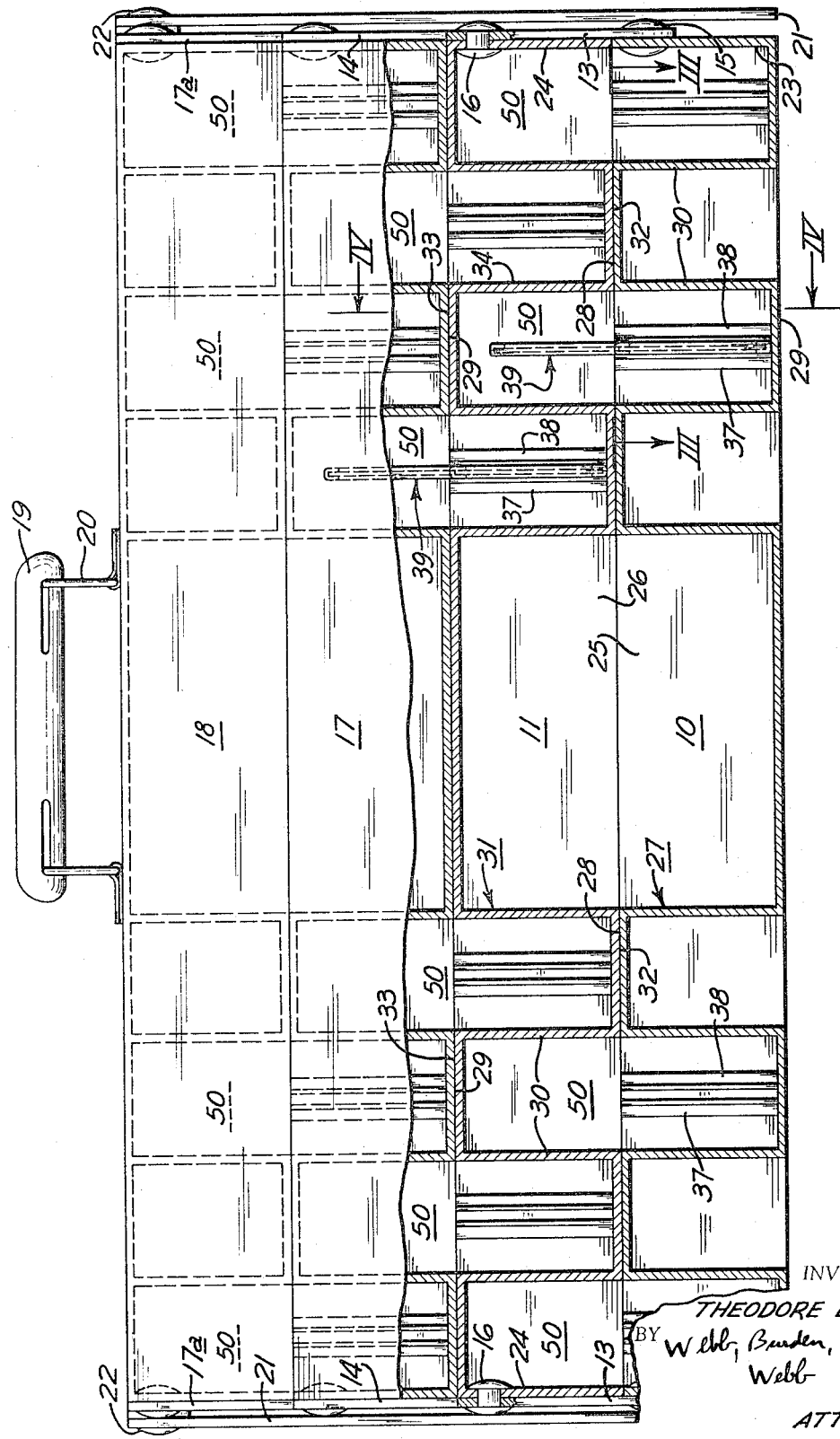

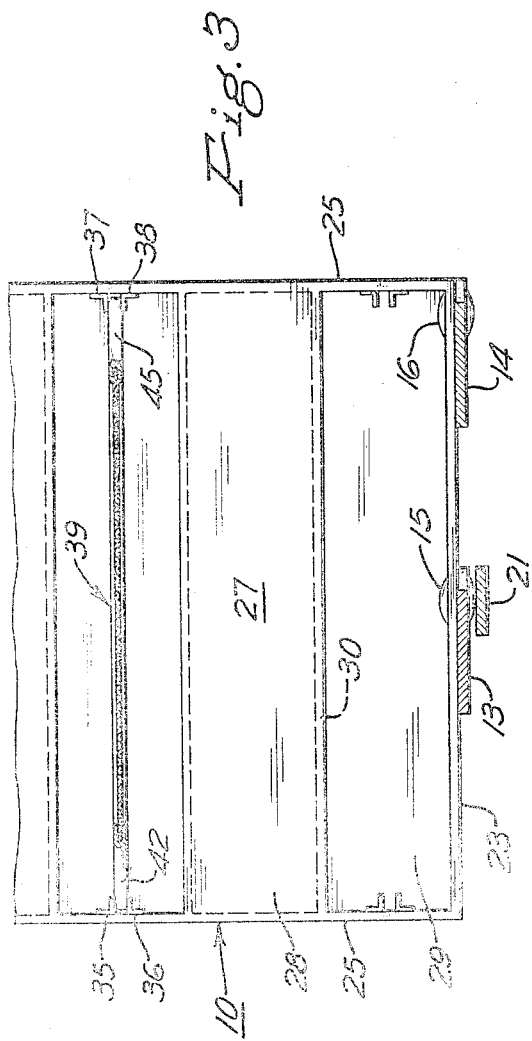
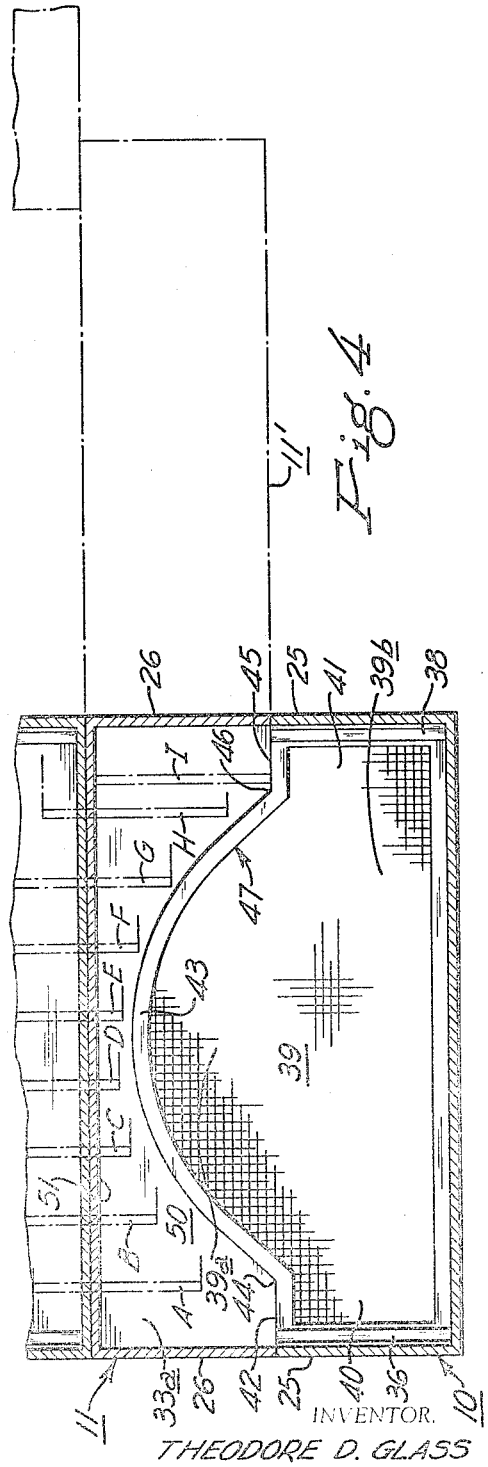

3,367,062
LURE LADDER FOR A FISHING TACKLE BOX
Theodore D. Glass, 841 Phoenix Ave.,
Chester, W. Va. 26034
Filed Apr. 7, 1966, Ser. No. 540,933
8 Claims. (Cl. 43—57.5)

This invention relates to fishing tackle boxes, and more particularly to the combination of a fishing tackle box and holders for fishing lures, known as lure ladders.

Fishermen have long sought a portable, versatile and utilitarian box for storing and carrying the lures, flies, hooks, tackle and other equipment used in fishing. Conventional closed and covered boxes fitted with brackets, bars, nets and shelves have been used for carrying fishing lures with varying degrees of success, though each has a number of deficiencies, namely, that lures and flies placed in the box are not easily accessible, tend to tangle with each other in the box and when placed in the box wet accelerate corrosion of the inside of the box and the other equipment therein.

My invention provides a durable, compact, useful tackle box and lure ladder as a solution to these problems. Specifically, my invention comprises a fishing tackle box having a number of trays which are adapted to be stacked one above the other and whose side walls of the trays form the outside of the box. Each tray includes a corrugated separator having ridges and valleys extending substantially the length of the side walls of the tray. When the trays are stacked, a valley on the bottom side of one separator is positioned above a valley on the top side of the separator below and a ridge on the bottom side of the separator above abuts a ridge on the top side of the lower separator to form a chamber which extends the length of the side walls of the box. Substantially vertically disposed wtihin such chamber, is a lure ladder which extends preferably, substantially the length of the side walls of the trays. The height of the ladder is greater than the depth of the valley in which the ladder is disposed so that when the box is closed a substantial portion of the ladder extends upwardly into the valley on the bottom side of the separaor in the tray above.

Preferably, the trays are movably secured to each other by a cantilever linkage fastened to the outside of the side walls, so that the trays may be stacked and unstacked vertically. When the trays are unstacked, i.e., the box is opened, the top of the separator in each tray is exposed so that a substantial portion of each lure ladder positioned therein is readily accessible for placement and removal of lures. A cover and a carrying handle, permit transfer of the box from place to place. Pivoted arms may be secured to the cover for supporting the box horizontally when it is open.

In a preferred embodiment, the ladders are removable for cleaning the trays and themselves.

In the accompanying drawings, I have shown a preferred embodiment of my invention in which:

FIGURE 2 is a partial longitudinal sectional view of the box of FIGURE 1 when closed;

FIGURE 3 is a section view along the line III—III of FIGURE 2; and

FIGURE 4 is a development view along the line IV—IV of FIGURE 2.

Figure 1:
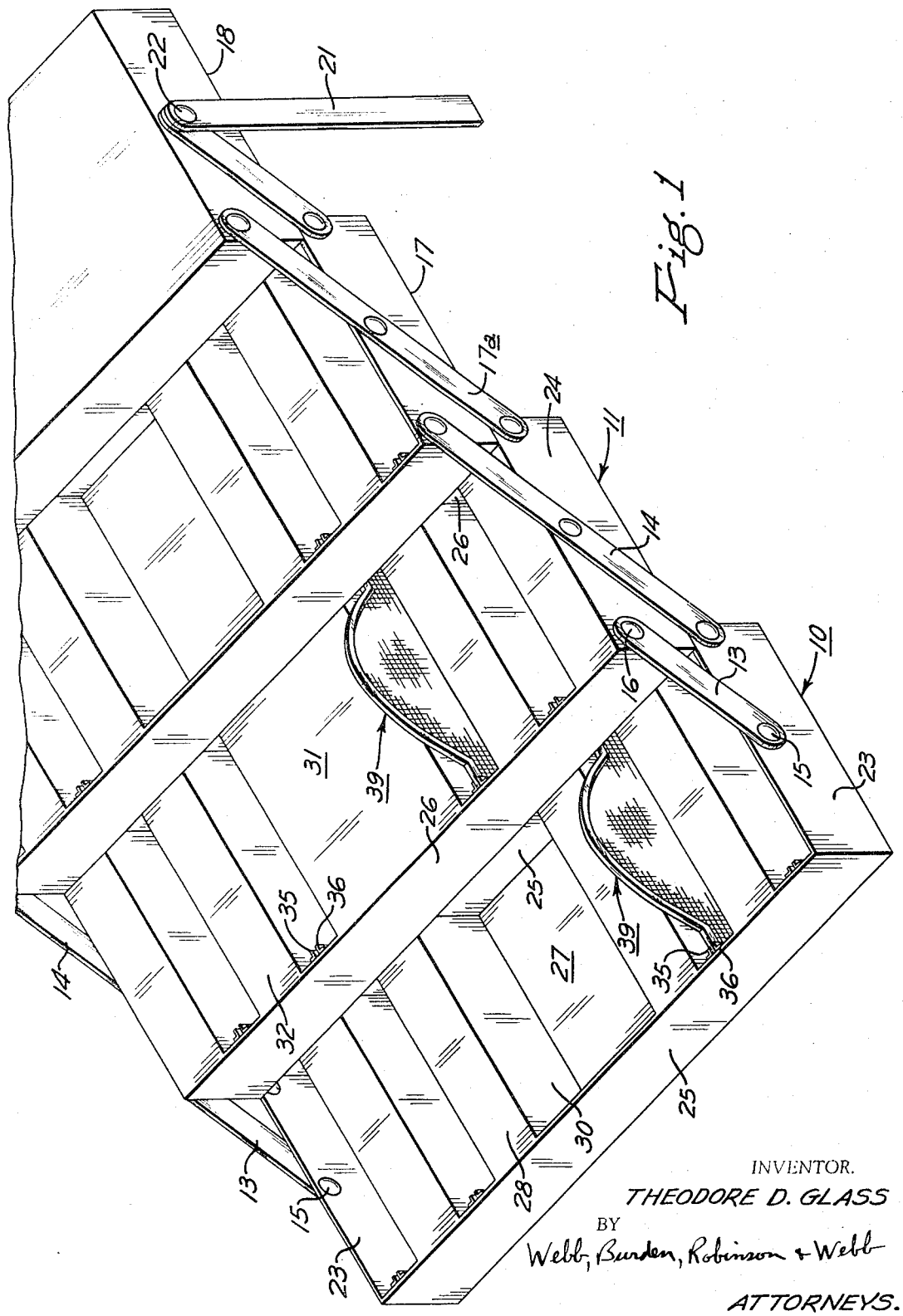
FIGURE 1 is a fragmentary isometric view of a fishing tackle box which includes lure ladders and which is shown in a open position.

Referring to FIGURE 1, the fishing tackle box comprises a first tray 10 (the bottom tray of the box) to which is movably secured a second tray 11. Parallel links 13 and 14 form a cantilever combination by which the trays 10 and 11 may be vertically stacked and unstacked to open the box. The links 13, are pivotally joined to the tray 10 by fasteners 15 and to the tray 11 by fasteners 16. Additional trays, such as 17, may be joined similarly to the trays 10 and 11 by links 17a (one shown) to increase the capacity of the box.

A cover 18, which has a carrying handle 19 secured to it by a bracket 20, forms the top closure of the box (FIGURE 2).

An arm 21 which is pivotally secured by fastener 22 to the cover of the box supports the trays horizontally when the box is opened.

Each tray includes side walls 23 and 24, respectively, which are in substantial vertical alignment when the box is closed. End walls 25 and side walls 23 form tray 10, and end walls 26 and side walls 24 form tray 11.

Within the tray 10 is a corrugated separator 27, which may be formed integrally with the tray or fabricated separately and connected to the tray. As shown in FIGURE 2, the separator comprises ridges 28 and valleys 29 running substantially the width of the tray. The longitudinal sides 30 of the valleys extend the width of the tray and extend upwardly to form the ridges 28. The tops of the ridges 28 and the bottoms of the valleys 29 are substantially flat and extend the length of the side walls of the tray. Within the tray 11 is a corrugated separator 31 which is substantially identical to the separator 27 of the tray 10. This separator 31 also includes ridges 32 with substantially flat tops and valleys 33 with substantially flat bottoms which run the width of the tray 11.

When the box is closed by stacking the trays, the side walls 23 and 24 of trays 10 and 11 are in vertical alignment, and the flat ridges 28 and 32 abut each other. The valleys 33 on the bottom side of the separator 31 of the upper tray are in alignment with the valleys 29 on the top side of the separator 27 in the lower tray 10. Thus, closing the box defines a plurality of chambers 50 which extend parallel to the side walls of the trays.

As shown in FIGURES 1 and 2, at one end of the valley which forms the bottom of a chamber 50 is a pair of spaced apart upstanding guides 35 and 36 attached to the wall 25. In substantial alignment with the guides 35 and 36 and at the opposite ends of the same valley is a second pair of guides 37 and 38 affixed to the opposite end wall 25, (FIGURE 3).

A lure ladder 39, preferably made of a corrosion resistant material, is removably located between the guides. Specifically, the lure ladder is (FIGURES 3 and 4), a thin member having a hemispherical upper portion 39a and a rectangular lower portion 39b. The height of the lower portion of the lure ladder substantially corresponds to the height of a side wall of its tray, and the length of the lower portion of the lure ladder is substantially equivalent to the length of the chamber 50 in which the lure ladder is disposed. Moreover, the length of the lower portion of the lure ladder is greater than the maximum dimension of the upper portion of the lure ladder, whereby the lower portion extends outwardly beyond the upper portion on each end of the ladder to provide end portions 40 and 41 of the lower portion of the ladder. Thus, the top edge of the lure ladder comprises a first short horizontal part 42 which intersects a hemispherical edge 43 of the upper portion at 44; and a second short horizontal part 45, on the opposite end of the upper edge of the ladder which intersects the edge 43 at 46. Accordingly, the periphery of the ladder along its top edge is above the side walls of the tray.

The end portions 40 and 41 of the lure ladder fit snugly between the guides 35, 36 and 37, 38 to support the ladder in a substantially vertical position within a tray.

A rigid frame 47 extends around the periphery of the lure ladder, and screen or mesh of suitable gauge for admitting the point of a fish hook is stretched across the frame so that the lures may be hung vertically from the ladder by placing a fish hook or its barb through the mesh. Lures may be hung on either side of the lure ladder with appropriate spacing between them to permit easy selection and removal or attachment.

FIGURE 4 illustrates the novel construction of my fishing tackle box. The bottom of the tray 10 is shown in section with the lure ladder held vertically between the guides. The tray 11 is stacked directly above the tray 10, such that a substantial portion of the lure ladder 39 extends upwardly into the valley 33a on the bottom side of the tray 11 with the top edge of the lure ladder being spaced apart from the inner side 51 of the valley.

To open the box, the upper tray 11 is cantilevered progressively through the successive positions A through I as shown in the development FIGURE 4. The identifying letters refer to the various positions of the wall 25 of the tray 11 as the box is opened. Specifically the tray 11 traces a substantially circumferential path from a closed or first position to an open or second position. From positions A through B and C to D, the tray 11 is moved to the right and upwardly over the end or first portion of the lure ladder. From position D to position E, the tray 11 travels substantially horizontally above the top of the lure ladder, with sufficient spacing being provided between the bottom of the wall 25 of the tray and the top edge of the lure ladder to permit the tray 11 to pass freely over and out of engagement with the lure ladder. From position E through positions F, G, and H, the tray 11 continues to advance from left to right in a downward semi-circular movement over and above the intersection 46 along the top edge of the lure ladder to position I, where the side walls of the trays abut. In this position, the end wall 25 of the tray 11 rests on the flat tops of the ridges 28 of the separator 27 in the lower tray 10 and partially covers the end portion 41 of the lure ladder. When the box is completely open the tray 11 has the position 11′ shown in broken outline in FIGURE 4.

This lure ladder construction is particularly suited to the tackle box disclosed herein; however, various modifications of the lure ladder are within my invention. For example, the upper portion of the lure ladder can be of substantially rectangular configuration rather than hemispherical. All that is required is that the lure ladder be of such overall dimensions that it will not interfere with the opening and closing of the box.

A substantial portion of the lure ladder extends into the valley in the bottom of the upper separator of a pair of stacked trays. When the side walls of the trays are of the same height and the ladder is of the configuration illustrated in FIGURES 1–4, the portion of the ladder which extends into the valley on the bottom side of the upper separator is substantially 20% of the total surface area of the ladder. However, if the side walls of the lower tray are of less height than the height of the side walls of the upper tray, only a small portion of the ladder is contained within the shallow lower tray and the surface area of the ladder which extends upwardly into the valley in the bottom of the upper separator up to about 90% of the total ladder area. The minimum depth of the lower tray is limited to that which effectively supports a lure ladder and a number of lures and/or flies hung therefrom.

Where more than a pair of trays form the box, all the trays may be successively unfolded in substantially the same manner as disclosed to provide access to lures and equipment stored in each tray. Moreover, it is possible to open inner trays, such as 11 without first opening a lower tray, such as tray 10, by handling trays 10 and 11 as a unit, and separating them from the remaining trays, as for example, tray 17.

My invention provides a lure ladder which accommodates all sizes and shapes of lures. In combination with the tackle box which I have disclosed, the lure ladder retains the lures in position for ready and easy selection. The lure ladders can be removably disposed in the box. By placing lure ladders in each of the chambers 50 shown in FIGURE 2, a significant number of lure ladders can be housed in the box without sacrificing easy accessibility to the lures. Finally, lures hung separately on my lure ladder tend to dry faster and will not be subject to tangling with each other or with other equipment in the tackle box.

While I have shown and described a preferred embodiment of my invention, it is to be understood that it may be otherwise embodied within the scope of the following claims.

I claim:

1. In a fishing tackle box, the combination comprising at least two trays pivotally interconnected, each tray having side walls and including a separator corrugated with at least one ridge and at least one valley on the top and the bottom thereof, each said ridge and valley extending substantially the length of the side walls, said trays being adapted to be stacked vertically and unstacked with the side walls thereof substantially in alignment when stacked, said valley in the bottom side of one separator of one tray being positioned above said valley in the top side of a second separator of a second tray of said trays and said ridge in the bottom side of said one separator being substantially in alignment with said ridge in the top side of said second separator to form a chamber extending substantially the length of the side walls upon stacking said trays, a lure ladder adapted to receive fish hooks substantially vertically disposed in said valley on the top side of said second separator, means retaining the lure ladder in said valley, the height of said lure ladder being greater than the depth of said valley of said second separator whereby a portion of said ladder extends into the valley on the bottom side of said one separator which forms the upper portion of said chamber upon stacking of said trays.

2. The combination of claim 1 wherein said ladder extends substantially the length of said chamber.

3. The combination of claim 1 wherein said lure ladder is removably disposed in said valley of said second separator.

4. The combination of claim 1 wherein the lure ladder is spaced apart from the longitudinal sides of said valley in said second separator.

5. The combination of claim 1 wherein said one and said second tray of said pair are movably secured to each other by linkage, said linkage comprising a pair of links, each link of said pair having an end secured to one of the side walls of said one tray and having an opposite end secured to one of the side walls of the said second tray for stacking and unstacking said trays by movement of said one tray from a first position whereat it closes the box to a second position whereat it opens the box and exposes said lure ladder.

6. The combination of claim 1 wherein said lure ladder comprises a lower portion having a length substantially that of said side walls and a substantially hemispherical upper portion whereby during unstacking of said trays, said one tray is raised upwardly and over said ladder and then downwardly and over same to a position substantially adjacent a rear portion of said ladder when the box is open.

7. The combination of claim 1 wherein an area of at least substantially 20% of the surface area of said lure ladder extends into the valley on the bottom side of said one separator and is accessible for use when the box is open.

8. The combination of claim 1 wherein the portion of the lure ladder which extends into the valley on the bottom side of said one separator comprises between substantially 20% and 90% of the total surface area of the ladder.

References Cited
UNITED STATES PATENTS

| | | | |
|---|---|---|---|
| 1,858,539 | 5/1932 | Dewey | 43—57.5 X |
| 1,992,435 | 2/1935 | Labadie et al. | 312—266 X |
| 2,675,290 | 4/1954 | Berry | 312—276 X |
| 2,711,050 | 6/1955 | McIntyre | 43—57.5 |
| 3,196,229 | 7/1965 | Glass | 206—65 |

HUGH R. CHAMBLEE, *Primary Examiner.*